United States Patent [19]

Muller et al.

[11] 4,044,171

[45] Aug. 23, 1977

[54] PROCESS FOR POLYADDITION PRODUCTS WHICH CONTAIN URETDIONE GROUPS AND USE IN COATINGS

[75] Inventors: Hanns Peter Müller, Leverkusen; Kuno Wagner, Leverkusen-Steinbuechel; Richard Müller, Bergisch-Neukirchen, all of Germany

[73] Assignee: Bayer Aktiengesellschaft, Leverkusen, Germany

[21] Appl. No.: 569,112

[22] Filed: Apr. 17, 1975

[30] Foreign Application Priority Data

Apr. 27, 1974 Germany .................. 2420475

[51] Int. Cl.$^2$ ................ B05D 7/26; C08G 18/79
[52] U.S. Cl. ................ 427/27; 260/75 NT; 260/77.5 AT; 427/120; 427/195; 427/385 R; 427/388 A
[58] Field of Search .......... 427/385 A, 385 B, 385 C, 427/385 R; 260/75 NT, 77.5 AT, 77.5 TB, 77.5 MA

[56] References Cited

U.S. PATENT DOCUMENTS

| | | | |
|---|---|---|---|
| 2,978,449 | 4/1961 | France et al. | 260/77.5 NC |
| 2,993,870 | 7/1961 | Burkus | 260/77.5 NC |
| 3,793,238 | 2/1974 | Winkelman et al. | 260/77.5 AM |
| 3,853,822 | 12/1974 | Brod et al. | 260/77.5 CR |
| 3,893,978 | 7/1975 | DeCleur et al. | 260/77.5 TB |
| 3,923,743 | 12/1975 | Quiring et al. | 260/75 NT |
| 3,926,875 | 12/1975 | Tsugkuni et al. | 260/77.5 TB |
| 3,947,426 | 3/1976 | Lander | 260/77.5 TB |

*Primary Examiner*—H.S. Cockeram
*Attorney, Agent, or Firm*—Gene Harsh; Lawrence S. Pope; Frederick H. Colen

[57] ABSTRACT

The present invention teaches a novel polyisocyanate lacquer binder and a method preparing it. The binder is prepared by reacting uretidione containing polyisocyanates optionally mixed with uretdione free diisocyanates with water or with low molecular weight compounds which have two alcoholic hyroxyl groups per molecule. Optionally these compounds may be mixed with up to 60 wt.% based on the total weight of hydroxyl bearing compounds, of low molecular weight compounds with one active alcoholic hydroxyl group per molecule. The proportion of reactants is so selected that the binder produces has from 5 to 20 wt.% of latent isocyanate groups in the form of unopened uretdione rings. The binder can then be mixed with polyhydroxyl compounds having molecular weights of 400 to 10,000 and conventional lacquer pigments and fillers. This mixture can then be coated on a substrate and the coating heated to above 110° C to effect hardening.

18 Claims, No Drawings

PROCESS FOR POLYADDITION PRODUCTS WHICH CONTAIN URETDIONE GROUPS AND USE IN COATINGS

FIELD OF THE INVENTION

This invention relates to a process for the preparation of new pulverulent polyaddition products which contain uretdione groups and which are suitable for use as cross-linking agents for powder lacquers based on binders or binder components which contain active hydrogen atoms, compounds obtainable by this process and their use as binder components in powder lacquers.

BACKGROUND OF THE INVENTION

Polyurethanes which contain uretdione groups in the macromolecule are already known (Kunststoff Handbuch Volume VII, Polyurethane, published by Vieweg-Hochtlen, Carl-Hanser-Verlag Munich, 1966, pages 17, 37). It is also known that compounds which contain uretdione groups undergo openings of the uretdione ring at elevated temperatures to liberate the isocyanate groups (J. H. Saunders and K. C. Frishch "Polyurethanes, Chemistry and Technology", Part I, Interscience Publishers (1962) pages 113 et seq.).

The coating of metal articles with pulverulent coatings is also already known. Various polymers which are applied as powders to the metal article and form a protective layer on it when melted may be used as one-component systems which are either self cross-linking or cannot be cross-linked.

Two-component or multicomponent systems and their use as lacquer raw materials, e.g. mixtures of blocked polyisocyanates with polyesters which contain hyroxyl groups, etc. are also known in the art (German Pat. No. 946,143). These compounds have the advantage over products which contain free isocyanate groups that at low temperatures, e.g. room temperature, they remain practically unchanged even when stored for a considerable length of time in the presence of water and polyalcohols and only liberate the blocking agents at elevated temperatures, generally substantially above 100° C, and then react with the polyfunctional reactants available, e.g. polyols, to form a cross-linked coating film.

These blocked isocyanates have the disadvantage that the blocking agent is liberated during the hardening reaction and given off to the surroundings. Some of the blocking agents are not physiologicaly harmless (phenols, mercaptans) and also have the added disadvantage of forming deposits in the cooler parts of a large stoving apparatus and therefore requiring substantial cleaning operations.

The polyaddition products with uretdione groups described in U.S. Pat. No. 3,248,370 and German Offenlegungsschriften Nos. 2,044,838 and 2,221,170 are also unsuitable for use as binders or binder components for thermosetting powder lacquers since they do not fulfill all the following basic requirements simultaneously:

a. the ability to be reduced to powders at temperatures below 30° C b. softening or melting point between 30° and 240° C preferably 70° to 180° C; and c. (in combination with reactants which contain active hydrogen atoms) a hardening temperature at least 10° to 40° C above the sotening or melting point (of the combination) and preferably above 110° C, in particular between 140° and 220° C.

This invention points the way to new polyisocyanate polyaddition products which contain uretdione groups and which satisfy these conditions and are therefore valuable new binder components for thermosetting powder lacquers.

SUMMARY OF THE INVENTION

This invention relates to a process for the preparation of pulverulent polyaddition products which contain uretdione groups and which are suitable for use as cross-linking agents for powder lacquer binders or binder components which contain active hydrogen atoms, by reacting polyisocyanates which contain a uretdione group or mixtures of such polyisocyanates and diisocyanates which are free from uretdione groups with water or with compounds which contain alcoholic hydroxyl groups capable of recting with isocyanate groups, characterized in that:

a. the reactants are reacted at an NCO/active hydrogen ratio of between 1:1 and 1:1.6;

b. the compounds which contain hydrogen atoms capable of reacting with isocyanate groups are water or aliphatic, cycloaliphatic or araliphatic compounds with molecular weights of from 62 to 300 which contain a total of two hydroxyl groups, mixed with from 0 to 60% by weight, based on the total quantity of compounds which contain active hydrogen atoms, of aliphatic, cycloaliphatic or araliphatic compounds within a molecular weight range of from 32 to 300 which contain one hydroxyl group; and c. the proportions by weight of reactants are so chosen that the products of the process contain from 2 to 20% by weight of latent NCO groups and from 0 to 2 hydroxyl end-groups per macromolecule.

This invention also relates to the new compounds obtainable by this process.

Also, the invention relates to the use of the new compounds obtainable by this process as binder components in powder lacquers which may be hardened at temperatures above 110° C in combination with from 5 to 85% by weight, based on the total quantity of binder, of polyhydroxyl compounds with molecular weights of from 400 to 10,000.

By "latent NCO groups" are meant in the context of this invention any NCO groups which are formed by thermal decomposition of the uretidione groups and which cannot find any reaction partners in the form of end groups of the cross-linking agent capable of reacting with NCO groups and are therefore available for the cross-linking reaction.

DETAILED DESCRIPTION OF THE INVENTION

Starting materials for the process according to the invention are polyisocyanates which contain uretdione groups, in particular diisocyanates of the type which may be obtained in known manner by dimerization of organic diisocyanates (see e.g. German Offenlegungsschriften Nos. 1,670,720 and 1,934,763 or "Kunstsoff-Handbuch", Volume VII, Polyurethane, Carl-Hanser-Verlag, Munich (1966), pages 16–17, and Polyurethanes: Chemistry and Technology, Part I, Saunders-Frisch, pages 91–94). These uretdione diisocyanates may easily be obtained from the corresponding isocyanates by a catalytic reaction. The catalysts used for this purpose are preferably tertiary phosphines which carry at least one aliphatic substituent, e.g. triethylphosphine, tributylphosphine or phenyldimethyl phosphine, or also pyridine.

Dimerization may be carried out in the absence of solvent or, preferably, in an inert organic solvent. The preferred solvents are benzene, toluene, methyl and ethyl glycol acetate, dimethylformamide, xylene and other aromatic or aliphatic hydrocarbons, also ketones, such as acetone, methyl butyl ketone or methyl isobutyl ketone and cyclohexanone, and chlorinated aromatic hydrocarbons as well as any mixture of these and other inert organic solvents.

To carry out the dimerization process, it is essential to stop the reaction when the mixture has a certain isocyanate content, preferably when from 25 to 50% and in particular from 26 to 39% of the NCO groups have undergone dimerization.

The reaction temperature required varies according to the catalyst used. For tertiary aliphatic or mixed aliphatic aromatic phosphines the optimum temperature range is from 0° to 120° C and temperatures of from 0° to 60° C are preferably employed. As is well known, if higher temperatures and lower catalyst concentrations are employed, isocyanurates and increasing quantities of other by-products, such as carbodiimides and uretone imines, are formed. Since the dimerization reaction in the presence of catalysts is an equilibrium reaction and the maximum degree of dimerization is obtained at low temperatures, it is customary to employ relatively low temperatures.

For dimerization by heating in the absence of a catalyst, temperatures of between 120° and 150° C are most suitable. At lower temperatures, the reaction mixture takes too long to reach equilibrium whereas at higher temperatures substantial conversion of uretdione to isocyanurate takes place.

The quantity of catalyst required varies according to the nature and purity of the isocyanate and the temperature employed. Quantities of from 0.1 to 5% by weight, based on the quantity of diisocyanate, are generally sufficient when tertiary aliphatic phosphines are used. The quantities employed are preferably from 0.3 to 2%

The quantity of free NCO groups established after a reaction time of from 0.5 to 4 hours at a reaction temperature of from 0° to 25° C in the presence of the above-mentioned catalyst generally corresponds to a conversion of from 26 to 39% of the isocyanate groups present when aromatic diisocyanates are used. The aromatic or mixed aromatic-aliphatic uretdione diisocyanates crystallize from the reaction mixture in the course of dimerization. The dimerization catalyst is inactivated by the addition of a heated 10% solution of sulphur in toluene.

In the process according to the invention, the uretdione diisocyanates obtainable in this way may be used either as the slole isocyanate component or as a mixture with diisocyanates which are free from uretdione groups. It is particularly preferred to use mixtures of from 50 to 100% by weight of uretdione diisocyanate and from 0 to 50% by weight of uretdione-free diisocyanate for the process according to the invention. Addition of the diisocyanate which is free from uretdione groups provides a simple means of varying the properties of the products as desired, in particular their melting points (see e.g. Example 1) since the monomeric diisocyanate which is free from uretdione groups is built into the products of the process thus decreasing the melting point.

The above-mentioned diisocyanate mixture prepared in situ and obtainable by partial dimerization of a suitable diisocyanate is particularly suitable for use as the isocyanate component in the process according to the invention. When this isocyanate component is subsequently reacted with the other reactants, the monomeric diisocyanate still present in the reaction mixture functions as "interference component".

The reaction mixture is heated to 90° to 100° C after inactivation of the catalyst. A clear solution of the uretdionediisocyanate/diisocyanate mixture is thereby obtained. The free NCO group content and the latent NCO group content in the uretdione undergo no further change in this temperature treatment. The Zerewitinoff active compounds used to synthesize the polyuretdione-polyurethanes are then added to the reaction mixture. The reactants may either be poured in all at once or gradually introduced into the polyisocyanate mixture which contains uretdione groups.

The following are examples of uretdione-free diisocyanates which may be used in the preparation of the uretdione diisocyanates and as a melting point decreasing component: aliphatic, cycloaliphatic, araliphatic, aromatic diisocyanates, such as those described e.g. by W. Siefken in Justus Liebigs Annalen der Chemie, 562, pages 75–136, for example ethylene diisocyanate, tetramethylene-1,4-diisocyanate; hexamethylene-1,6-diisocyanate, dodecane-1,12-diisocyanate, cyclobutane-1,3-diisocyanate, cyclohexane-1,3- and 1,4-diisocyanate and mixtures of these isomers, 1-issocyanato-3,3,5-trimethyl -5-isocyanatomethyl-cyclohexane (U.S. Pat. No. 3,401,190) hexahydrotolylene-2,4- and -2,6-diisocyanate and mixtures of these isomers, hexahydrophenylene-1,3- and/or -1,4-diisocyanate, perhydrodiphenylmethane-2,4'- and/or -4,4'-diisocyanate, phenylene-1,3- and -1,4-diisocyanate, tolylene-2,4- and -2,6-diisocyanate and mixtures of these isomers, diphenylmethane-2,4'- and/or 4,4'-diisocyanate and napthylene-1,5-diisocyanate.

Commercially readily available diisocyanates are particularly preferred, e.g. tolylene-2,4- and -2,6-diisocyanate and mixtures of these isomers, 1-isocyanato-3,3,5-trimethyl-5-isocyanatomethyl-cyclohexane, hexahydrotolylene-2,4- and -3,6-diisocyanate and mixtures of these isomers, perhydrodiphenylmethane-2,4'- and/or 4,4'-diisocyanate and hexamethylene-1,6-diisocyanate.

In the process according to the invention, the isocyanate component exemplified above is reacted with suitable compounds which contain active hydrogen atoms at an NCO/active hydrogen ratio of between 1:1 and 1:1.6, preferably between 1:1 and 1:1.2.

These compounds with reactive hydrogen atoms are water or aliphatic, cycloaliphatic or araliphatic compounds with molecular weights in the range of from 62 to 300 which contain a total of two hydroxyl groups, mixed with from 0 to 60% by weight, preferably 0 to 10% by weight of aliphatic, cycloaliphatic or araliphatic alcohols having molecular weights in the range of from 32 to 300, which alcohols are monofunctional for the purpose of the isocyanate polyaddition reaction.

The reactants for the isocyanate component used in the process according to the invention are preferably water and/or alcohols of the formula $R(OH)_n$ wherein $n = 1$ or 2 and, if $n = 1$, R denotes an aliphatic hydrocarbon group with from 1 to 18 carbon atoms optionally interrupted by ether oxygen atoms or a cycloaliphatic hydrocarbon groups with from 5 to 7 carbon atoms or a benzyl radical and, if $n = 2$, R denotes an aliphatic hydrocarbon group with from 2 to 18 carbon atoms optionally interrupted by ether oxygen atoms or a cycloaliphatic hydrocarbon group with from 5 to 15 carbon atoms or an araliphatic hydrocarbon group with 8-14 carbon atoms which may contain ether groups.

The following are examples of such dihydric alcohols: ethylene glycol, propylene-1,2- and -1,3-glycol, butylene-1,4- and -2,3-glycol, hexane-1,6-diol, octane-1,8-diol, neopentyl glycol, 1,4-bis-hydroxymethylcyclohexane, 2-methyl-propane-1,3-diol, diethyleneglycol, triethyleneglycol, tetraethylene-glycol, dipropyleneglycol, tripropyleneglycol and dibutyleneglycol, 1,4-dihydroxy-cyclohexane, 1,4-bis-(2-hydroxyethoxyl)-benzene. 2-ethyl-hexane-1,3-diol is particularly preferred as a diol which acts as linking component in the synthesis of the polyuretdione polyurethanes according to the invention.

Examples of suitable monohydric alcohols include methanol, ethanol, n-butanol, n-decanol, n-octadecanol, cyclohexanol, benzyl alcohol, glycol monoethylether and the ethoxylation and/or propoxylation products of monohydric alcohols within the above-mentioned molecular weight range.

The quantity in which the compounds which are monofunctional for the purpose of the isocyanate polyaddition reaction should be used in the process according to the invention depends particularly on the functionality of the uretdione polyisocyanate used. Particularly if partial dimerization of aromatic diisocyanate is carried out and particularly of tolylene diisocyanates, the reaction products consists practically exclusively of mixtures of strictly difunctional isocyanates. When aliphatic diisocyanates are dimerized, however, the possibility of the isocyanate mixture also containing higher functional polyisocyanates and in particular polyisocyanates which contain isocyanurate groups cannot be completely excluded. The presence of these higher functional components must be compensated or overcompensated in the process according to the invention by adding monofunctional reactants. In the process according to the invention the reactants are otherwise used in such proportions that the products of the process contain from 4 to 20% by weight, preferably from 5 to 15% by weight, of latent isocyanate groups and from 0 to 2 hydroxyl end groups per molecule.

The properties of the products and particularly their melting points may easily be influenced by suitable choice of the reactants which contain active hydrogen atoms. Diols with branched hydrocarbon chains generally give rise to lower melting products than those obtained from diols with straight carbon chains.

To carry out the process according to the invention, the reactants are mixed in the given proportions. Generally, the isocyanate component is introduced into the reaction vessel and the other reactant is added. The reaction may be carried out in the absence of solvent or in the presence of suitable solvents, e.g. benzene, toluene, methyl, or ethyl glycol acetate, dimethylformamide, xylene or other aromatic or aliphatic hydrocarbons, also ketones, such as acetone, methyl butyl ketone or methyl isobutylketone and cyclohexanone and chlorinated aromatic hydrocarbons as well as any mixtures of these and other inert organic solvents.

The process according to the invention is generally carried out at temperature of from 0° to 150° C preferably from 80° to 120° C. The products of the process generally crystallize during and after cooling of the reaction mixture. Catalysts which accelerate the isocyanate polyaddition reaction may also be used in the process according to the invention. Only catalysts which do not contain strongly basic centers may be used because those with strongly basic centers, which are otherwise commonly used in polyisocyanate chemistry, are liable to cause premature opening of the uretdione ring in the process according to the invention.

On the other hand, organic metal compounds may be used as catalysts in the process according to the invention, particularly organic tin compounds.

The organic tin compounds used for preferably tin-(II) salts of carboxylic acids, such as tin-(II) acetate, tin-(II) octoate, tin-(II) ethyl hexoate and tin-(II) laurate, and the dialkyl tin salts of carboxylic acids, e.g. dibutyl tin diacetate, dibutyl tin dilaurate, dibutyl tin maleate or dioctyl tin diacetate.

Other examples of catalysts which may be used in the process according to the invention and details concerning the action of these catalysts have been described in Kunststoff-Handbuch, Volume VII, published by Vieweg and Hochtlen, Carl-Hanser-Verlag, Munich (1966) e.g. on pages 96–102 and Polyurethanes: Chemistry and Technology, Volume I, Chemistry, Saunders and Frisch, pages 127–215.

The catalysts are generally used in a quantity of between about 0.001 and 10% by weight based on the quantity of compounds containing hydrogen atoms which are reactive with isocyanates.

Reaction retarders may also be used in the process according to the invention, e.g. substances which are acid in reactions, such as hydrochloric acid or organic acid halides.

The reaction mixtures are generally worked-up by first freeing the polyuretdione polyurethanes from any solvent used. This may be carried out by simply drying the crystalline polyuretdione polyurethane in air or by other known methods, such as spray drying or melt extrusion in the evaporating screw.

The products according to the invention are generally compounds with molecular weights of from 800 to 5000 preferably from 900 to 4000. They have a melting point of from 30° to 240° C preferably from 70° to 180° C. They are particularly suitable for use as hardeners for higher functional thermoplastic compounds which contain Zerewitinoff active hydrogen atoms. In combination with such compounds which contain Zerewitinoff active hydrogen atoms the products of the process form systems which may be hardened at temperatures of above 110° C, preferably frm 160° to 220° C to form high quality synthetic resins. The most important field of application for such systems is their use as binders for powder lacquers.

Suitable reactants for the products of the process for producing such thermosetting systems are compounds of the kind know per se in polyurethane chemistry which contain amino, thiol, carboxyl and/or hydroxyl groups. It is preferred to use polyhydroxyl compounds, in particular compounds with from 2 to 8 hydroxyl groups and especially those with a molecular weight of from 400 to 10,000 preferably from 1000 to 6000, e.g. polyesters, polyethers, polythioethers, polyacetals, polycarbonates, polyesteramides, polyepoxides and polyacrylates which contain at least 2, generally 2 to 8 and preferably 2 to 4 hydroxyl groups, of the kind which are known per se for producing polyurethanes.

Suitable polyesters with hydroxyl groups include, e.g. the reaction products of polyhydric alcohols, preferably dihydric alcohols, with the optional addition of trihydric alcohols, and polybasic, preferably dibasic, carboxylic acids. Instead of free polycarboxylic acid, the corresponding polycarboxylic acid anhydrides or esters with lower alcohols or mixtures thereof may be used for producing the polyesters. The polycarboxylic acids may be aliphatic, cycloaliphatic, aromatic and/or heterocyclic and may be substituted, e.g. by halogen atoms, and/or may be unsaturated. The following are mentioned as examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride; maleic acid, maleic acid anhydride, fumaric acid, dimeric and trimeric fatty acids, such as oleic acid, optionally mixed with monomeric fatty acids, dimethylterephthalate, and bis-glycol terephthalate. Furane-2,5-dicarboxylic acid may also be used. Suitable polyhydric alcohols include, e.g. ethylene glycol, propylene-1,2- and -1,3-glycol, butylene -1,4- and -2,3-glycol, hexane-1,6-diol, octane-1,8-diol, neopentylglycol, cyclohexane dimethanol (1,4-bis-hydroxymethylcyclohexane), 2-methylpropane-1,3-diol, glycerol, trimethylolpropane, hexane-1,2,6-triol, butane, 1,2,4-triol, trimethylolethane, pentaerythritol quinitol, mannitol, and sorbitol, ethyl glycoside, diethyleneglycol, triethyleneglycol, tetraethyleneglycol, polyethylene glycols, dipropylene glycols, polypropylene glycols, dibutylene glycol and polybutylene glycols. The polyesters may also contain a proportion of carboxyl end groups. Polyesters of lactones may also be used, e.g. $\epsilon$-caprolactone or hydroxycarboxylic acids, e.g. $\omega$-hydroxycaproic acid.

The polyethers containing at least 2, generally 2 to 8 and preferably 2 or 3 hydroxyl groups which may also be used according to the invention are known per se and may be obtained, e.g. by the polymerization of expoxides, such as ethylene oxide, propylene oxide, butylene oxide, tetrahydrofuran, styrene oxide or epichlorohydrin, each with itself, e.g. in the presence of $BF_3$, or by addition of these epoxides optionally as mixtures or successively, to starting components which contain reactive hydrogen atoms, such as alcohols or amines, e.g. water, ethylene glycol, propylene-1,3- or -1,2-glycol, trimethylolpropane, 4,4'-dihydroxydiphenyl-propane, aniline, ammonia, ethanolamine, or ethylene diamine. Sucrose polyethers as described, e.g. in German Pat. No. 1,064,938 and British Pat. Nos. 957,946 and 957,947 may also be used according to the invention. It is frequently preferred to use those polyethers which contain predominantly primary OH groups (up to 90% by weight, based on all the OH groups present in the polyether). Polyethers modified by vinyl polymers of the type which may be obtained, e.g. by the polymerization of styrene or acrylonitrile in the presence of polyethers (U.S. Pat. Nos. 3,383,351; 3,304,273; 3,523,093 and 3,110,695 and German Pat. No. 1,152,536) and polybutadienes which contain OH groups are also suitable.

Among the polythioethers there should be particularly mentioned the condensation products of thiodiglycol with itself and/or with other glycols, dicarboxylic acids, formaldehyde, aminocarboxylic acids or amino alcohols. The products are polythio mixed ethers, polythioether esters or polythioether ester amides, depending on the cocomponent.

Suitable polyacetals are, e.g. the compounds which may be obtained from glycols, such as diethylene glycol, triethyleneglycol, 4,4'-dioxethoxy-diphenyldimethylmethane, hexane-diol, and formaldehyde. Polyacetals suitable for the purpose of the invention may also be prepared by the polymerization of cyclic acetals.

Suitable polycarbonates with hydroxyl groups are also known per se e.g., those which may be prepared by reacting diols, such as propane-1,3-diol, butane-1,4-diol, and/or hexane-1,6-diol, diethyleneglycol, triethylene glycol, or tetraethyleneglycol, with diaryl carbonates, e.g. diphenylcarbonate or phosgene.

The polester amides and polyamides include, e.g. the predominantly linear condensates obtained from polyvalent saturated and unsaturated carboxylic acids such as e.g. phthalic acid or their anhydrides and polyvalent saturated and unsaturated amino alcohols such as e.g. ethanol amine, diamines, polyamines such as ethylene diamine, diethylene triamine and mixtures thereof.

Suitable polyepoxides are, e.g. the known reaction products of bisphenol A with epichlorohydrin.

Suitable hydroxpolyacrylates include, e.g. the known copolymers of olefines, such as acrylonitrile and/or styrene with acrylic and/or methacrylic acid esters in which the alcohol component consists at least partly of a diol, such as ethylene glycol or propane-1,2-diol.

The preferred reactants used with the products of the process for producing binders for powder lacquers are, of course, solid representatives of the compounds given above as examples, particularly those with softening points between 60° and 120° C and preferably between 80° and 100° C. The mixtures which are capable of cross-linking generally contain from 0.5 to 1.5 hydroxyl groups per latent NCO groups, based on the aforesaid polyhydroxyl compounds. The mixtures of reactants used as powder lacquers preferably have a melting point of from 50° to 150° C, preferably from 70° to 120° C. Care must be taken to ensure that the melting point of the powder lacquer binder ready for use in at least 10° to 20° C below the cross-linking temperatures.

The mixtures of polyuretdione polyurethanes according to the invention with the above-described compounds which contain Zerewitinoff active hydrogen atoms may be prepared in the same reaction vesseel after the synthesis. Homogeneous, clear, self-crosslinking two-component resins are thereby obtained after evaporation of the solvent, e.g. in melt extruders. The resins may be mixed with the known dyes, pigments, fillers, other resins, hardening catalysts, auxiliary agents, such as levelling agents, UV absorbents, matting agents, etc. in the conventional manner either at the same time or in a separate operation. The binders may, of course, be used unpigmented, e.g. as clear lacquers, or they may be dissolved in solvents and used, e.g. for wire lacquering and as electroinsulating materials.

The advantages of the new polyuretdione polyaddition products according to the invention are obvious:
1. Physiologically inert latent polyisocyanates from which no compounds are split off are obtained by a simple "in situ" process from diisocyanates and alcohols without changing the reaction vessel.
2. With suitable choice and combination of starting compounds, the reactive systems according to the invention may be prepared not only in powder form, as is preferred according to the invention, i.e. in crystalline form, but also in a resinous or viscous form.

3. The simple method of preparing the new polyuretdione polyurethanes as free flowing, physiologically inert reactive powders which are free from groups which are split off opens up new possibilities in the production of powder lacquers which may be stored. The polyuretdione-polyurethane cross-linking agents are compatible with a variety of numerous hard, linear or branched polyhydroxyl compounds and may be mixed with them in extruders without undergoing permature reactions. The extruders resins obtained are hard and brittle and may easily be ground down. Powders applied to sheets by the known electrostatic powder spray process flow at temperatures of about 80° to 120° C and may be stoved at temperatures of from 130° to 220° C, preferably from 150° to 180° C within 15 to 30 minutes. Matt to high gloss metal coatings which are weather resistant and elastic and have high impact strength are obtained after stoving.

4. The reactive powders are stable in storage and not blocking even under extreme conditions (action of water, storage at 60° C). They have no tendency to spontaneous ignition or dust explosions.

The invention will now be explained in more detail with the aid of the following Examples. Unless otherwise indicated, the parts given are parts by weight. The percentages of latent NCO groups in the uretdione refer to the NCO groups actually available for a cross-linking reaction (OH end groups of the cross-linking agent are taken into account).

EXAMPLE 1

"In situ" process for the preparation of polyuretdione polyurethanes

348 Parts of tolylene-2,4-diisocyanate are dissolved in 1300 parts of partly distilled toluene. 7.2 parts of tri-n-butylphosphine are added to the mixture at 20° C. The dimerization product begins to separate after a reaction time of only 5 minutes (gentle cooling is advisable at this stage). By the end of 1 hour, the NCO value has dropped from the original 48.3 to 34.0%. After 2.5 hours the NCO value of the mixture is 31% (if the reaction temperature is maintained at 20° C, the NCO value of the mixture thereafter changes only insignificantly even after several hours!). When the NCO content of the mixture has settled at 30 to 31%, the dimerization catalyst is inactivated by stirring 2.28 parts of sulphur into the mixture. The mixture is then heated to 90° C with stirring. A clear solution is obtained. 213 Parts of 2-ethyl-hexane-1,3-diol are then added to the diisocyanate mixture and the reaction temperature is maintained at 90° to 110° C for 6 hours. No more free NCO groups can then be detected IR spectroscopically. The reaction mixture is left to cool and the somewhat swelled crystal paste is spread out on sheets and dried in air. A very fine, free flowing powder melting at from 146° to 168° C is obtained. The average molecular weight of the polyuretdione polyurethane is 1889. The polyuretdione polyurethane contains 11.8% of latent NCO groups.

The method described in Example 1 is used to prepare numerous other aromatic polyuretdione polyurethanes with differing uretdione contents. The Table clearly shows the influence of the interference diisocyanate on the melting point of the polyuretdione polyurethanes.

| Example No. | Starting Components | | | Mol of diol | Polyuretdione polyurethanes | | |
|---|---|---|---|---|---|---|---|
| | Diisocyanate | Mol | Diol | | M.p. ° C | MW | Latent NCO |
| 2 | Dimeric tolylene diisocyanate (TDI) | 3.6 | 2-ethyl-hexane-1,3-diol | 5 | 170 | 2051 | 10.65% |
| | Monomeric tolylene diisocyanate (TDI) | 0.4 | | | | | |
| 3 | Dimeric tolylene diisocyanate | 2.15 | 2-ethyl-hexane-1,3-diol | 5 | 140 | 1802 | 5.3% |
| | Monomeric tolylene diisocyanate | 1.85 | | | | | |
| 4 | Dimeric TDI | 2.66 | 2-ethyl-hexane-1,3-diol | 5 | 160 | 1889 | 7.4% |
| | Monomeric TDI | 1.34 | | | | | |
| 5 | Dimeric TDI | 3.6 | 2-ethyl-hexane-1,3-diol | 5 | 175 | 2051 | 10.65% |
| | Monomeric TDI (20% 2,6-isomer) | 0.4 | | | | | |
| 6 | Dimeric TDI | 3.6 | Hexane-1,6-diol | 5 | 200 | 1902 | 11.45% |
| | Monomeric TDI (80/20) | 0.4 | | | | | |

EXAMPLE 7

Polyuretdione polyurethane from dimeric hexamethylenediisocyanate

45 Parts of butane-1,4-diol and 74 parts of n-butanol are dissolved in 126 parts of toluene. About 20 parts of toluene are distilled off to dry the alcohols. 0.5 ml of benzoyl chloride and 0.5 ml of dibutyl tin dilaurate (20% solution in ethyl glycol acetate) are added to the reaction mixture. 384 Parts of dimeric hexamethylenediisocyanate (2 NCO equivalent) dissolved in 20 parts of anhydrous toluene are added dropwise to the mixture at room temperature in the course of 1 hour. Gentle cooling is necessary. No more free NCO groups can be detected by means of IR spectroscopy after a reaction time of 3 hours. The polyuretdione polyurethane crystallizes from the toluene solution. A somewhat waxy, crystalline product melting at 75° to 83° C is obtained after drying in air. The polyuretdione polyurethane contains 10.6% of latent NCO.

EXAMPLE 8

This example serves to demonstrate the possibility of preparing highly concentrated lacquer solutions from viscous polyuretdione polyurethanes.

A. 0.5 Parts of benzoyl chloride and 1 part of dibutyl tin dilaurate (20% solution in ethyl glycol acetate) area added to 131.6 parts of 2-ethylhexane-1,3-diol, 6.2 parts of ethylene glycol and 152 parts of glycol monoethyl-ether. 788 parts (4 NCO equivalents) of a polyisocyanate mixture consisting substantially of dimeric hexamethylene diisocyanate are added dropwise to this mixture at room temperature with stirring (exclusion of moisture) in the course of 45 minutes. The reaction mixture spontaneously heats up to 70°–72° C. It now contains only 1.03% of free NCO groups. 269 Parts of toluene and 27 parts of glycol monoethylether are added and the mixture is heated to 90° C for 1 hour. No more free NCO groups can then be detected by IR spectroscopy. The adusted 80% solution in toluene has a viscosity of 3840 cP at 20° C and contains 8.15% of latent NCO groups.

then left to stand overnight at room temperature without stirring. No more free NCO groups can be detected by IR spectroscopy at the end of this time. The colorless, slightly swollen crystal paste is then spread out on sheets and dried in air. A dust fine, free-flowing polyuretdione polyurethane powder is obtained (see Table 1). The IR spectra of the polyuretdione polyurethanes show that characteristic intensive band of the uretdione group at 1780 cm$^{-1}$.

| Example No. | Starting Components | | | Mol of diol | Polyuretdione Polyurethanes | | |
|---|---|---|---|---|---|---|---|
| | Diisocyanate | Mol | Diol | | M.p. ° C. | MW | Latent NCO |
| 9 | Dimeric TDI | 4 | Octane diol (isomer) | 5 | 200–205 | 2122 | 11.85% |
| 10 | Dimeric TDI | 4 | Hexane-1,6-diol | 5 | 240 | 1982 | 12.75% |
| 11 | Dimeric TDI | 4 | Ethane-1,2-diol Hexane-1,6-diol | 2 3 | 250 | 1870 | 13.5% |
| 12 | Dimeric TDI | 4 | 1,4-bis-(2-hydroxy-ethoxy)-benzene | 5 | 260 | 2383 | 10.75% |
| 13 | Dimeric TDI | 4 | Diethylene glycol | 5 | 250 | 1922 | 13.1% |
| 14 | Dimeric TDI | 4 | Ethylene glycol | 5 | 250 | 1702 | 15.0% |
| 15 | Dimeric TDI | 4 | Tetraethyleneglycol | 5 | 220 | 2362 | 10.65% |
| 16 | Dimeric TDI | 4 | 1,4-Dihydroxy-methyl cyclohexane | 5 | 240 | 2112 | 11.9% |
| 17 | Dimeric TDI | 4 | Neopentyl glycol | 5 | 210 | 1912 | 13.2% |
| 18 | Dimeric TDI | 4 | Butane-1,4-diol | 5 | 240 | 1843 | 13.7% |
| 19 | Dimeric TDI | 4 | 2-ethyl-hexane-1,3-diol | 5 | 190–200 | 2122 | 11.9% |

B. 100 Parts (0.194 NCO equivalents) of the crosslinking agent described under (A) are mixed with 25.85 parts of an 80% solution in toluene (0.097 OH equivalents) of a polyester (OH number 250–270) prepared from phthalic acid, hexahydrophthalic acid and trimethylolpropane and 4.3 parts of trimethylolpropane (0.097 OH equivalents ) dissolved in 1.07 parts of toluene. The 80% lacquer solution has a viscosity of 6940 cP at 20° C.

C. When 100 parts (0.194 NCO equivalents) of the polyuretdione polyurethane cross-linking agent described under (A) are mixed with 51.9 parts (0.194 OH equivalents) of an 80% solution in toluene of a polyester (OH number 250 to 270) prepared from phthalic acid, hexahydrophthalic acid and trimethylolpropane, an 80% lacquer solution with a viscosity of 16,200 cP at 20° C is obtained.

The concentrated lacquer solutions may be diluted to suitable viscosities with the conventional lacquer solvents. Stoved lacquer films are hard and glossy with a good texture and elastic and solvent-resistant (insoluble in toluene and ethyl glycol acetate).

EXAMPLES 9–19

Polyuretdione polyurethanes synthesized from dimeric tolylene diisocyanate and diols without an interference diisocyanate are summerized in the following Table (for comparison with Examples 2–6).

GENERAL METHOD OF OPERATION 1.5 Parts of diol are dissolved in 1.5 liters of toluene. Approximately 100 ml of toluene are then distilled off. 1.2 mol of dimerized 2,4-diisocyanatotoluene are rapidly introduced into this dehydrated reaction mixture at a reaction temperature of 80° to 90° C. The dimerized 2,4-diisocyanatotoluene introduced first dissolves to form a clear solution when stirred vigorously. The reaction mixture is then stirred for a further hour at 90° C, during which time the polyuretdione polyurethane begins to precipitate from the toluene solution. Only a small quantity of free NCO groups can by that time be detected by IR spectroscopy. The reaction mixture is

EXAMPLE 20

313.2 Parts of tolylene-2,4-diisocyanate are dissolved in 1300 parts of partly distilled toluene. 7.2 Parts of tri-n-butyl-phosphine are added to the mixture at from 5° to 7° C. Dimerization product begins to separate after a short time. After 1.5 hours, the NCO value (free NCO) has dropped from an initial 48.3 to 29.6%. After 3.5 hours the NCO value (free NCO) is 26.6%. The dimerization catalyst is then inactivated by stirring in 22.8 parts of a hot 10% solution of sulphur in toluene, and 33.6 parts of hexamethylene diisocyanate are added to the reaction mixture. The NCO content of the mixture is then 28.7%. The mixture is heated to 90° C with stirring, a clear solution being obtained. Even this temperature treatment no longer changes the NCO content (free NCO) although uretdione diisocyanate and free diisocyanate are present side-by-side in the reaction mixture. 194.5 Parts of 2-ethylhexane-1,3-diol are then poured all at once into the reaction mixture. The mixture is then stirred at 90° C for 3 hours. No more free NCO can then be detected by IR spectroscopy. The mixture is left to cool. Polyuretdione polyurethanes crystallizes from the toluene solution. The crystal paste is spread out on sheets and dried in air. A very fine, free-flowing powder melting at 160° to 163° C is obtained. The average molecular weight of the polyuretdione polyurethane is 3650. The polyuretdione polyurethane contains 10.3% of latent NCO (the OH end groups have already been deducted from the total uretdione content of the polyuretdione polyurethane, as in all the other Examples).

EXAMPLE 21

313.2 Parts of tolylene-2,4-diisocyanate are dissolved in 975 parts of anhydrous methyl glycol acetate and 325 parts of anhydrous toluene. The reaction mixture is cooled to 10° C and 7.2 parts of tri-n-butylphosphine are added. The reaction mixture is stirred for 3.5 hours at 10° to 15° C with cooling. 22.8 Parts of a 10% solution of sulphur in toluene are then added. A clear solution is obtained after heating the reaction mixture to 100° C. 33.6 Parts of hexamethylenediisocyanate are added to this solution. The NCO content of the mixture (free NCO) is then 26.8%. 0.3 parts of benzoyl chloride and 182 parts of 2-ethyl-hexane-1,3-diol are then added and the mixture is stirred under nitrogen at 100° C for 4 hours. Only a little free NCO can then be detected by IR spectroscopy. After the addition of 0.4 parts of dibutyl tin dilaurate (20% solution in ethyl glycol acetate) the mixture is stirred for one more hour. No more free NCO can then be detected spectroscopically in the reaction mixture. The IR spectrum shows only the characteristic uretdione band at 1780 cm$^{-1}$. The polyuretdione polyurethane crystallizes from the solvent mixture on cooling. A fine crystalline powder melting at from 140° to 155° C is obtained after drying. The average molecular weight is 3826. The polyuretdione polyurethane contains 11.35% of latent NCO.

EXAMPLE 22

Preparation of a powder lacquer ready for use

1. Method of operation:

The required components (100 parts of a branched terephthalate polyester (1.5% OH) and 34 parts of polyuretdione polyurethane from Example 21) are mixed with finely divided titanium dioxide pigment. A commercial copolymer of butyl acrylate and 2-ethylhexylacrylate of an approx. viscosity of 200 000 cP/20° C is used as levelling agent. It is incorporated in the form of a so-called master batch, i.e. 100 parts of polyester are melted with 10 parts of levelling agent and the mixture is size reduced when solidified.

The mixture is homogenized in a commercial two-shaft shelf cleaning extruder. The jacket temperature is adjusted so that the temperature of the outlet of the apparatus is about 125° C. The molten cake may either be left to itself, or as is customary in practice, it may be rapidly cooled in a continuously operating squeezing and cooling apparatus. When it has been cooled to temperatures of from 20° to 30° C, it is first ground coarsely and then fineground while cooled with blowers. The finely divided powder obtained is then freed from coarser particles larger than about 90 μm by wind or mechanical sifting.

The powder lacquer obtained in this way is then applied by means of an electrostatic spray device. Conventional commercial products may be used for this purpose.

The voltage used may be either positive or negative in relation to the workpiece and may be about 20 to 100 KV.

To obtain homogeneous, smoothly flowing and mechanically perfect films, the powder is then melted and hardened in a stoving oven at temperatures of from 160° to 220° C.

2. The usual lacquer technical properties of a combination of terephthalate polyester/polyuretdione polyurethane cross-linking agent from Example 21: Steel sheets of thickness 0.5 mm are used unless otherwise indicated.

The tests are carried out after the samples have been stoved at 180° C for 30 minutes or 200° C for 10 minutes.

Elasticity Tests

1. Elasticity test by Erichsen cupping according to DIN 53 156: 9 mm or until the metal sheet cracks.

2. Conical mandrel according to ASTM D 522-41: 37% (= free from faults).

3. Grid cut according to DIN 53 151 apparatus Gt. C: O (= free from faults, optimal).

4. Pencil hardness according to DIN 46 450*: 3H
* Regulations for testing wire lacquers.

The knife test produces a tough elastic chip and confirms the excellent adherence in the grid cut test.

The solvent resistance indicates good chemical cross-linking. The lacquers are resistant to toluene, ethyl glycol acetate and acetone and may be exposed to them for several minutes before the surface begins to soften. The coating does not dissolve but only swells slightly.

The corrosion resistance is tested by the salt spray test according to DIN 53 167. The surface to which the coating is applied is pretreated with zinc phosphate (similar to that sold under the Trademarks "Bonder 125", of Metallgesellschaft, or "Granodine A 16", of Collardin). The corrosion resistance test shows under-surface rusting of at the most 3 mm of a previously applied cut after 400 hours. The adherence test by the grid cut or by adhesive tape carried out immediately after removal from the salt spray gives the best possible results.

The test for resistance to washing liquor carried out to determine the performance in conventional household detergents, again using steel sheet pretreated with zinc phosphate, shows a resistance without faults after more than 40 hours' exposure to the test solution at 100° C.

Very smooth lacquer surfaces without orange peel effect or retraction from the edges is observed in all cases. The films are homogeneous and free from bubbles.

EXAMPLE 23

395 Parts of a polyisocyanate mixture obtained by dimerizing hexamethylenediisocyanate are dissolved in 200 parts of acetone. 0.45 Parts of benzyl dimethylamine and 9 parts of water are added to the mixture and the reaction mixture is then heated to 60° C for 2 hours. 11.2 parts of carbon dioxide are evolved. 200 Parts of n-butanol are then added to the mixture which is then heated to 90° C for a further 3 hours. The acetone is distilled off and the resulting melt is poured out on metal sheets. The polyuretdione polyurea obtained has a melting point of 70° to 77° C, an average molecular weight of 992 and a latent NCO content of 12.15%. The IR spectrum of the polyuretdione polyurea has the characteristic uretdione band at 1760 to 1780 cm$^{-1}$.

EXAMPLE 24

348 Parts of dimerized tolylene diisocyanate are dissolved in 975 parts of methyl glycol acetate and 325 parts of toluene at 100° C. 41.4 parts of n-butanol are added to the mixture which is then heated to 110°0 C for 30 minutes. 15.1 parts of water and 0.10 parts of benzyl dimethylamine are then added at 110° C. 18.6 Liters of carbon dioxide are evolved in the course of 4.5 hours while the temperature is kept constant. The polyuretdione polyurea obtained crystallizes from the reaction solution on cooling. After drying, a free-flowing powder melting at from 215° to 219° C is obtained. The polyuretdione polyurea has an average molecular weight of 1314 and contains 18.3% of latent NCO.

What is claimed is:

1. Process for the preparation of pulverulent polyaddition products which contain uretdione groups and which are suitable for use as cross-linkage agents for powder lacquer binders or powder lacquer binder components which contain active hydrogen atoms, by reacting polyisocyanates which contain a uretdione group or mixtures of such polyisocyanates and diisocyanates which are free from uretdione groups with water or with compounds which contain alcoholic hydroxyl groups capable of reacting with isocyanate groups, characterized in that:

a. the reactants are reacted together at an NCO/OH ratio of between 1:1 and 1:1.6;

b. the compounds containing hydrogen atoms which are reactive with isocyanate groups are water or aliphatic, cycloaliphatic or araliphatic compounds with molecular weights of from 62 to 300 which contain a total of two hydroxyl groups, mixed with from 0 to 60% by weight, based on the total quantity of compounds with active hydrogen atoms, of aliphatic, cycloaliphatic or araliphatic compounds with molecular weight of from 32 to 300 which contain one hydroxyl group; and c. the reactants are used in such proportions that the products of the process contain from 5 to 20% by weight of latent NCO groups and from 0 to 2 hydroxyl end groups.

2. Process according to claim 1, characterized in that the compounds with active hydrogen atoms used correspond to the formula:

$$R(OH)_n$$

wherein $n = 1$ or 2 and if $n = 1$, R denotes an aliphatic hydrocarbon group with from 1 to 18 carbon atoms optionally interrupted by ether oxygen atoms or a cycloaliphatic hydrocarbon group with from 5 to 7 carbon atoms and, if $n = 2$, R denotes an aliphatic hydrocarbon group with from 2 to 18 carbon atoms optionally interrupted by ether oxygen atoms or a cycloaliphatic hydrocarbon group with from 5 to 15 carbon atoms.

3. Polyaddition products with uretdione groups obtainable according to claim 1.

4. The process of claim 1 wherein 0 to 10 wt.% of the monofunctional active hydrogen compounds are used and the reaction is carried out at a temperature of about 0° to 150° C.

5. The process of claim 4 wherein the reaction is carried out at a temperature of about 80° to 120° C.

6. The product obtainable by the process of claim 1 having a melting point in the range of about 30° to 240° C and a molecular weight of 800 to 5000.

7. The product of claim 6 having a melting point in the range of 70° to 180° C and a molecular weight of 900 to 4000.

8. A process for the coating of substrates which comprises:

a. mixing the cross-linking agent of claim 1 with from 5 to 85% by weight based on the total quantity of binder, of polyhydroxyl compounds free from uretdione groups having molecular weights of from 400 to 10,000 and conventional lacquer pigments and fillers, b. coating the mixture on a substrate, and c. heating the coating at temperatures in excess of 110° C until it hardens.

9. The process of claim 8 wherein the polyhydroxyl compound has a softening point of between 60° and 120° C.

10. The process of claim 9 wherein the polyhydroxyl compound has a softening point of between 80° and 100° C.

11. The process of claim 8 wherein the mixture has a softening point of between 50° and 150° C and wherein the mixture begins to crosslink at temperatures at least 10° C in excess of the softening point.

12. A process for the preparation of pulverizable latent cross-linking agents which comprises 1. dimerizing diisocyanates in the presence of a dimerization catalyst,
2. then inactivating the dimerization catalyst, and
3. reacting said dimerized reaction mixture containing said inactivated catalyst with
4. compounds containing hydrogen atoms reactive with isocyanate groups selected from the groups consisting of water and aliphatic, cycloaliphatic or araliphatic compounds with molecular weights of 62 to 300 which contain one or two hydroxyl groups wherein said compounds are comprised of no more than 60 wt.% of monohydroxy compounds,
5. wherein the reactants are used in such proportions that the NCO/OH ratio is between 1:1 and 1:1.6 and the products of the process contain from 5 to 20 wt.% of latent NCO groups and from 0 to 2 hydroxyl end groups.

13. The process of claim 12 wherein the entire process is conducted in a single vessel.

14. The process of claim 12 wherein the dimerization catalyst is selected from the group consisting of tertiary phosphines which carry at least one aliphatic substituent and pyridine.

15. The process of claim 12 wherein the dimerization catalyst is inactivated by the addition of sulphur.

16. The process of claim 12 wherein the dimerization catalyst is selected from the group consisting of triethylphosphine, tributyl phosphine, phenyldimethylphosphine and pyridine and 0.1 to 5 wt.% of catalyst based on the weight of diisocyanate is used.

17. A process for the coating of substrates which comprises:

a. mixing a cross-linking agent prepared according to claim 12 with from 5 to 85 wt.%, based on the total quantity of a lacquer binder, of polyhydroxyl compounds free from uretdione groups having molecular weights of from 400 to 10,000 and conventional lacquer pigments and fillers, b. coating said mixture on a substrate, and c. heating the coating at temperatures in excess of 110° C until it hardens.

18. The product obtainable by the process of claim 12 containing inactivated dimerization catalyst and having a melting point in the range of about 30° to 240° C and a molecular weight of 800 to 5000.

* * * * *